Figure 1:
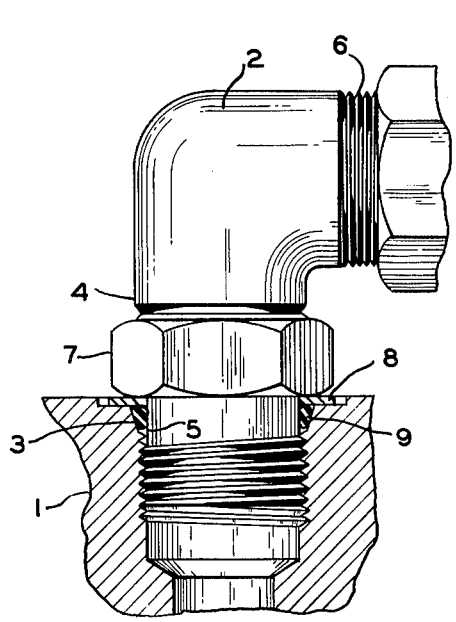

March 15, 1966 L. H. SCHMOHL 3,240,515
PACKED JOINT AND COMPONENTS THEREOF
Filed Feb. 4, 1960

INVENTOR.
LELAND H. SCHMOHL
BY
Oberlin, Maky & Donnelly
ATTORNEYS

United States Patent Office

3,240,515
Patented Mar. 15, 1966

3,240,515
PACKED JOINT AND COMPONENTS THEREOF
Leland H. Schmohl, Chagrin Falls, Ohio, assignor to Parker-Hannifin Corporation, Cleveland, Ohio, a corporation of Ohio
Filed Feb. 4, 1960, Ser. No. 6,821
2 Claims. (Cl. 285—212)

This application is a continuation-in-part of my co-pending applications Serial Nos. 574,901 and 588,440, filed March 29, 1956 and May 31, 1956, respectively, both now abandoned. The present invention relates as indicated to a packed joint and the components thereof.

In general, the packed joint herein is of familiar form and frequently referred to in the art as a "straight thread boss joint." In such joint, an elbow, a T or like coupling member has one leg thereof screwed into a boss with a deformable packing ring disposed in an annular packing chamber that is defined by a counterbore at the end of the boss and a peripheral groove in the threaded leg of the coupling member. In the conventional form of boss joint, the packing chamber is closed by means of a lock nut which is threaded onto the coupling member and which abuts the end of the boss, said lock nut additionally serving to lock the coupling member so that its other leg or legs as the case may be point in any desired direction.

A serious problem encountered with known boss joints of the character described above and particularly in a fluid system which handles high pressures is that the packing ring extrudes into the helical groove between the lock nut and coupling member threads or between the lock nut threads and the peripheral groove of the coupling member, thereby rendering the packing ring inefficient as a fluid-tight seal. Another disadvantage of the conventional boss joint is that the boss thereof is formed with a countersunk end of relatively large included angle whereby a large size lock nut must be employed having wrench pads which are spaced apart a distance exceeding the diameter of the countersink; such large diameter countersink further requiring a greater center-to-center distance between said boss and the next adjacent boss.

In one known form of boss or internally theaded coupling member, namely the Air Force-Navy Aeronautical Design Standard Boss Specification AND 10050, the end of the boss terminates adjacent the internal threads in a cylindrical counterbore and an adjoining countersink which has an included angle of 120°.

With such AND 10050 boss, the externally threaded coupling member may be a straight connector provided with an integral radially extending collar, commonly in hexagon form to provide wrench engaging pads, which abuts the countersunk end of the boss, said connector being formed with a peripheral groove between the collar and external threads which define with the countersink and counterbore of the boss an annular packing chamber into which the O-ring of rubber-like material is adapted to be squeezed.

The AND 10050 boss joint is also adapted to couple with elbows or T fittings for universal rotary positioning by use of a lock nut which is threaded onto the elbow or T and which thus takes the place of the aforesaid integral collar.

One objection to the AND 10050 boss joint is that the diameter of the countersink must be substantially larger than the outside diameter of the O-ring in order to prevent pinching of the O-ring between the collar and the end face of the boss. The collar (or lock nut) must then be of still larger hex size in order to make metal-to-metal contact with the end face of the boss and to completely overlie and close the countersink to prevent extrusion of the packing under high fluid pressures. Such large hex sizes increase the center-to-center dimensions required between boss machinings on valve bodies and the like, which is a disadvantage in many instances.

Another disadvantage of the AND 10050 boss is that the rubber O-ring is sharply deformed over the juncture of the 120° countersink and the cylindrical counterbore. This subjects the O-ring to very high localized stress and leads to early failure of the same.

With the foregoing in mind, it is an object of the present invention to provide an O-ring boss joint in which the chamber end wall defining member may be of minimum size to permit close spacing of a multiple of bosses.

It is another object to provide a boss joint of the type described in which the rubber O-ring is not highly stressed in localized zones so that early failure thereof will be avoided.

It is another object to provide a boss joint in which the countersink has a relatively small included or apex angle between 24 and 30 degrees, with the outer diameter of the countersink not larger than the outside diameter of the O-ring and wherein the outer edge of the countersink is broken by means of a small radius or additional chamfer to facilitate entry of the O-ring.

It is another object of this invention to provide an O-ring boss joint characterized by its ease of assembly and involving a progressive wedging of the O-ring into the annular packing chamber without danger of pinching the O-ring between the abutting surfaces of the coupling members even though the maximum diameter of the chamber may be less than the outside diameter of the O-ring.

It is another object of this invention to provide an O-ring boss joint which is leak-proof under either high internal fluid pressures or under subatmospheric internal pressures.

Another object is to provide an O-ring boss joint in which the outer wall of the annular packing chamber is a continuous, uninterrupted, smooth surface which extends an axial distance slightly greater than the radial cross-section diameter of the O-ring and the cross-section area or volume of the packing chamber is sufficiently larger than that of the O-ring whereby sufficient room is provided in the chamber to accommodate normal expansion or swell of the O-ring due to temperature and/or contact with the fluid being sealed.

Another object is to provide an O-ring boss joint in which the annular packing chamber has a width such that the cross-section diameter of the O-ring will be distorted to approximately 75 percent of its initial width whereby substantial contact pressure is attained between the O-ring and the side walls of the packing chamber, but without inducing high localized stresses in the O-ring.

Another object of this invention is to provide a novel coupling member which has a rigid packing retainer ring or washer assembled thereon to eliminate, when installed in a boss, gaps into which the packing ring can extrude.

Other objects of the invention will appear as the description proceeds.

To the accomplishment of the foregoing and related ends, said invention then comprises the features hereinafter fully described and particularly pointed out in the claims, the following description and the annexed drawing setting forth in detail an illustrative embodiment of the invention, this being indicative, however, of but one of the various ways in which the principle of the invention may be employed.

Figure 2:
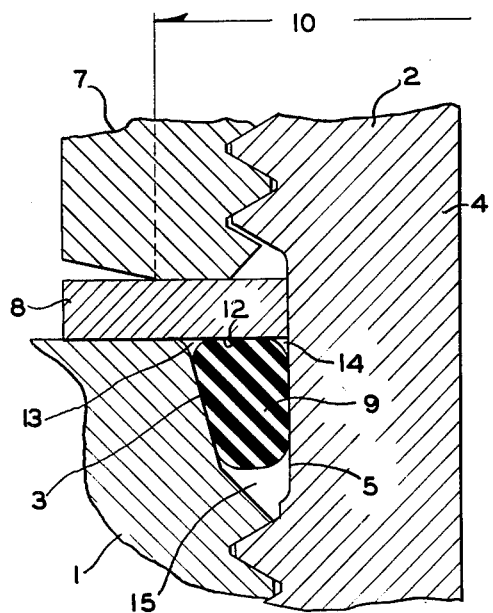
Figure 3:
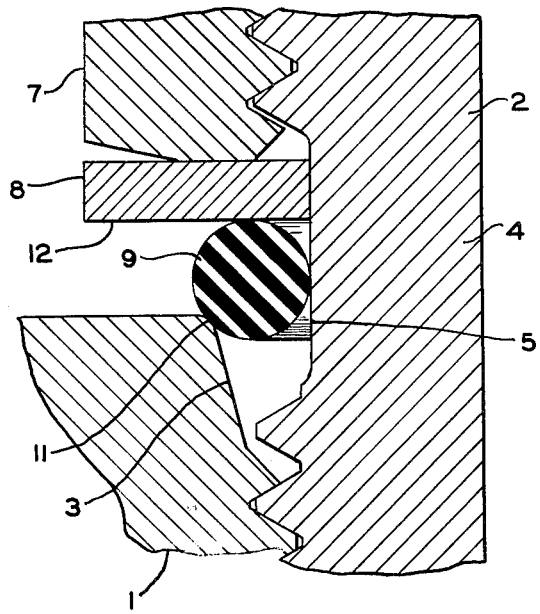

In said annexed drawing:
FIG. 1 is a side elevation view partly in cross-section showing the present packed joint;

FIG. 2 is an enlarged fragmentary cross-section view of the packing chamber and packing retainer; and FIG. 3 is an enlarged fragmentary cross-section view similar to FIG. 2 except showing the relationship of the O-ring to the coupling members just before the O-ring is wedged into the packing chamber.

As shown in FIGS. 1, 2, and 3, the packed joint herein comprises coupling members 1 and 2 which are screwed together, the internally threaded coupling member 1 being shown as a boss having a tapered or frusto-conical counterbore 3 which constitutes the outer wall of an annular packing chamber, and the externally threaded coupling member 2 being shown as an elbow whose one threaded leg 4 is formed with a peripheral groove 5 which constitutes the inner wall of said packing chamber. The axial dimension of the groove 5, as well known in the art, is preferably such that when the coupling member 2 is screwed into the boss 1 to approximately the desired extent with groove 5 opposite the counterbore 3, said coupling member 2 may be turned in or backed off so that the other leg 6 points in the desired direction.

A lock nut 7 is threaded onto the series of threads which are axially beyond the end of the boss 1 and in the conventional boss joint the lock nut 7 would be turned down to firmly abut the end of said boss 1, thereby leaving a helical gap between the lock nut and coupling member threads or between the lock nut threads and the peripheral groove 5.

However, in the present case there is interposed between the lock nut 7 and the end of boss 1 a rigid packing retainer 8 which is clamped between said boss and said lock nut and which snugly embraces the peripheral groove 5 of coupling member 2. Said retainer 8 thus serves to completely close the annular packing chamber so that there are no gaps or clearances into which the deformable packing ring 9 in said chamber may be extruded under the influence of high fluid pressure. Moreover, said retainer 8 engages the end of the boss 1 around the counterbore 3 so as to enable the use of a lock nut 7 which is of minimum size commensurate with the thread size and the number of threads which have to be engaged. In the present case, a hex lock nut 7 is used and the distance 10 across the flats thereof is substantially less than would otherwise be required to properly overlap around the end of the boss 1.

As aforesaid, the retainer 8 has a snug fit on the groove 5 but said retainer is axially movable with respect to the coupling member 2 when the latter is assembled with the boss 1. Thus, when initially screwing in the coupling member 2 into the boss 1, the retainer 8 may be urged upwardly with respect to the coupling member 2, or vice versa said retainer 8 may be forced downwardly by the lock nut 7 while the coupling member 2 is held against rotation.

Referring to FIG. 3, the countersink 3 of the internally threaded coupling member 1 has an included angle or apex angle between 24 and 30°, and is of axial depth approximately 20 percent greater than the cross-section diameter of the rubber-like O-ring 9 which is adapted to be positioned around the groove 5 of the externally threaded coupling member 2.

The diameter of the countersink 3 at its small end is approximately equal to or slightly greater than the major diameter of the internal threads of the coupling member 1 and is approximately equal to the mean diameter of the O-ring. The diameter of the countersink 3 at its large end is slightly less than the outside diameter of O-ring 9 and has the corner broken as by a small radius as shown.

In any case, the diameter of the countersink 3 at its large end being less than the outside diameter of the O-ring 9, is adapted to contact the latter at a region 11 which is conducive to inward deformation thereof rather than outward expansion and consequent pinching of the O-ring between the countersunk end of member 1 and the transverse end wall defined by the retainer 8.

As can be seen, when the coupling members 1 and 2 are screwed tightly together from the FIG. 3 position to the FIG. 2 position, the O-ring 9 will nearly fill the annular packing chamber defined by the groove 5, the countersink 3, and the transverse end wall 12 defined by retainer 8 and will be wedged therein to make sealed engagement with the countersink 3 and groove 5.

Because the countersink 3 is of diameter less than the outside diameter of the O-ring 9, the retainer 8 may be of minimum size while yet ensuring abutting engagement with member 1.

It should be emphasized that said packing ring 9 is preferably an O-ring whose initial outside diameter is equal to or slightly greater than the maximum diameter of the counterbore 3 and that said counterbore 3 preferably has a relatively small included or apex angle between 24° and 30°, for example, for wedgingly receiving said packing ring 9 therein without objectionable radial expansion or pinching between the end of boss 1 and the retainer 8 as the coupling member 2 is being screwed into said boss 1. This is in contrast to existing boss joints wherein the counterbore has an included angle of 120°, for example, and is of diameter considerably larger than the initial outside diameter of the O-ring.

The retainer 8 is preferably a continuous ring or washer made of relatively rigid, strong and heavy gauge metal such as cold rolled steel of 16 gauge and is assembled on the coupling member 2 in a manner clearly described in my copending application Ser. No. 588,440, filed May 31, 1956.

Insofar as assembly of this coupling is concerned, the user will place the O-ring on the groove 5, the retainer 8 being disposed at the upper end of the groove 5 as best shown in FIG. 3. The coupling assembly (coupling member 2, lock nut 7, retainer 8, and O-ring 9) is then screwed into coupling member 1 as shown in FIG. 3. The coupling assembly is then screwed in until the retainer 8 engages the end face of the coupling member 1 to wedge the O-ring 9 into the annular packing chamber and deforms the same as shown in FIG. 2.

Thereafter, by reason of the making of the groove 5 of member 2, about one thread longer than required, the member 2 may be unscrewed as much as one full turn, for example, from the FIG. 1 position while holding the lock nut 7 against retainer 8. When said coupling member 2 is in the desired adjusted rotary position, the lock nut 7 is then turned tightly down against the retainer to lock said coupling member 2 in such adjusted rotary position.

In making up this assembly it is desirable, but not mandatory, to apply a small amount of lubricant, such as light oil or petrolatum, on the O-ring 9 to facilitate the wedging thereof into the packing chamber as the coupling members 1 and 2 are screwed together.

The countersink 3 is somewhat longer, preferably about 20 percent, than the cross-sectional diameter of the O-ring in order to insure a continuous, uninterrupted, and smooth surface for the packing to wedge against, and also to provide about 15 to 20 percent more volume in the packing chamber than that of the O-ring in order to accommodate swelling of the packing and tolerance variations in the parts.

When the parts are in their final position, as shown in FIG. 2, the width of the packing chamber is such that the transverse cross-sectional dimension of the O-ring has been reduced about 75 percent at the point of maximum distortion, which would be slightly below the centroid of the O-ring cross-section. It has been found that this amount of distortion provides sufficient pressure between the packing and the packing chamber walls without overstressing the O-ring.

The moderate taper of 12° to 15° for the outer wall 3 of the packing chamber also facilitates utilization of fluid pressure for establishing a tighter seal regardless of the direction in which the fluid pressure is acting, and without causing localized high stresses in the rubber.

Thus when there is high fluid pressure interiorly of the joint, it acts on the underside of the O-ring and tends to move upward. This tends to wedge the O-ring tighter into the spaces 13 and 14, but since the adjacent walls of countersink 3 and retainer 8 and groove 5 and retainer 8 do not form sharply acute angles, the rubber is not highly distorted when forced into the spaces and localized stress is minimized.

In the reverse situation when the fluid pressure within the joint is sub-atmospheric, the O-ring 9 will be wedged downward slightly into the space 15 and again there is no sharp or substantial distortion of the rubber and high localized stresses are again avoided.

In the present case, the outer wall 3 of the packing chamber is tapered at an angle of about 12–15° and is dimensioned at the middle to make the radial dimension thereat approximately 75–80% of the cross-section diameter of the O-ring 9. Thus, the cross-section area of the packing chamber yet remains approximately the same as that of the radial cross-section area of the O-ring.

However, by reason of the 12–15° taper as aforesaid, the radial dimension at the small end of the chamber is about one-half the cross-section diameter of the O-ring, and at the large end is yet preferably smaller than the outside diameter of the O-ring, but yet sufficiently large so as not to impede the easy wedging of the O-ring into the packing chamber without the objectionable radial expansion and pinching between the coupling members.

It has been found that an O-ring 9 deformed to this extent uniformly from a dimension which is about one-half the radial cross-section diameter of the O-ring to a radial dimension which is about equal to or only slightly less than the radial cross-section diameter of the O-ring provides a leak-proof joint. Moreover, there are no portions of the deformed O-ring 9 which tend to creep away from the walls of the packing chamber.

As best shown in FIG. 2, the cross-section area of the packing chamber is preferably slightly more (about 15%) than the cross-section area of the O-ring whereby the O-ring may expand therein due to temperature or swelling of the rubber. Also, the clearance spaces 15, 13 and 14 take into account tolerance variations in the dimensions of the O-ring itself and of the countersink 3 and groove 5.

Other modes of applying the principle of the invention may be employed, change being made as regards the details described, provided the features stated in any of the following claims, or the equivalent of such, be employed.

I therefore particularly point out and distinctly claim as my invention:

1. In combination, an internally threaded coupling member terminating at one end in a smooth, coaxial countersink of relatively small included angle of about 24° to 30° which is of diameter at its small end approximately equal to the major diameter of the internal threads, an externally threaded coupling member screwed into said internally threaded coupling member and formed with a cylindrical peripheral groove which is of uniform diameter slightly smaller than the minor diameter of the external threads and which is radially spaced concentrically within said countersink, said externally threaded coupling member providing a rigid and smooth transverse end wall which extends across the space between said groove and countersink to form a gapless joint with said groove and which abuts the end of said internally threaded coupling member to eliminate a gap thereat; and an O-ring of rubber-like deformable, but substantially incompressible material wedged in the annular packing chamber defined by said countersink, said groove, and said end wall; said O-ring being initially positioned in contact around said groove and against said end wall for wedging into said countersink during screwing together of said coupling members, said O-ring when thus positioned having an outside diameter which is slightly larger than the maximum diameter of said countersink, the axial length of the countersink and groove from such transverse end wall to the threads of said coupling members being greater than the radial cross-section diameter of said O-ring by an amount exceeding the axial dimension of said O-ring when radially squeezed in such chamber and such that the radial cross-section area of the chamber bounded by smooth uninterrupted surfaces of said groove, transverse end wall and countersink, exceeds the radial cross section area of said O-ring, and the radial width of the packing chamber at the middle of the axial length of said countersink being about 75 to 80% of the radial cross section diameter of said O-ring and at the small end of said countersink being approximately equal to the mean diameter of said O-ring as initially positioned around said groove.

2. The combination of claim 1 wherein the transverse end wall of said externally threaded coupling member comprises a circumferentially continuous, rigid, flat ring disposed around said peripheral groove; said flat ring being thinner than the axial length of said groove, having a uniform inside diameter that is axially slidable in contact around said groove to form such gapless joint therearound, and having an outside diameter that is greater than the diameter of such countersink at the mouth of said internally threaded coupling member and wherein a lock nut is threaded onto said externally threaded coupling member adjacent to one side of said flat ring and adapted, when turned, to engage said flat ring to forcibly move the latter axially along such groove to tightly clamp said flat ring directly against the end of said internally threaded coupling member radially outwardly of the counterbore; said nut being shaped so that it is maintained by said flat ring out of contact with the end of said internally threaded coupling member and is locked by direct frictional engagement with said flat ring; said flat ring being effective to unyieldingly retain said O-ring from displacement in the packing chamber under the influence of fluid under pressure and to eliminate gaps between said flat ring and the end of said internally threaded coupling member and between said flat ring and such groove of said externally threaded coupling member.

References Cited by the Examiner

UNITED STATES PATENTS

| | | | |
|---|---|---|---|
| 1,512,619 | 10/1924 | MacClatchie | 285—342 |
| 2,342,425 | 2/1944 | Parker | 285—220 |
| 2,343,235 | 2/1944 | Bashark | 285—220 |
| 2,394,097 | 2/1946 | Parker | 285—220 |
| 2,459,608 | 1/1949 | Wolfram | 285—340 |
| 2,459,668 | 1/1949 | Melichar | 285—212 |
| 2,476,074 | 7/1949 | Unger | 285—212 |
| 2,481,404 | 9/1949 | Donner | 285—190 |
| 2,919,147 | 12/1959 | Nenzell | 285—390 |

FOREIGN PATENTS

| | | |
|---|---|---|
| 198,232 | 9/1938 | Switzerland. |

OTHER REFERENCES

Parker O-ring catalog 903, pages 16 and 38–45, August 1950.

CARL W. TOMLIN, *Primary Examiner.*

ARTHUR B. MILLER, THOMAS F. CALLAGHAN,
*Examiners.*